Figure 1:
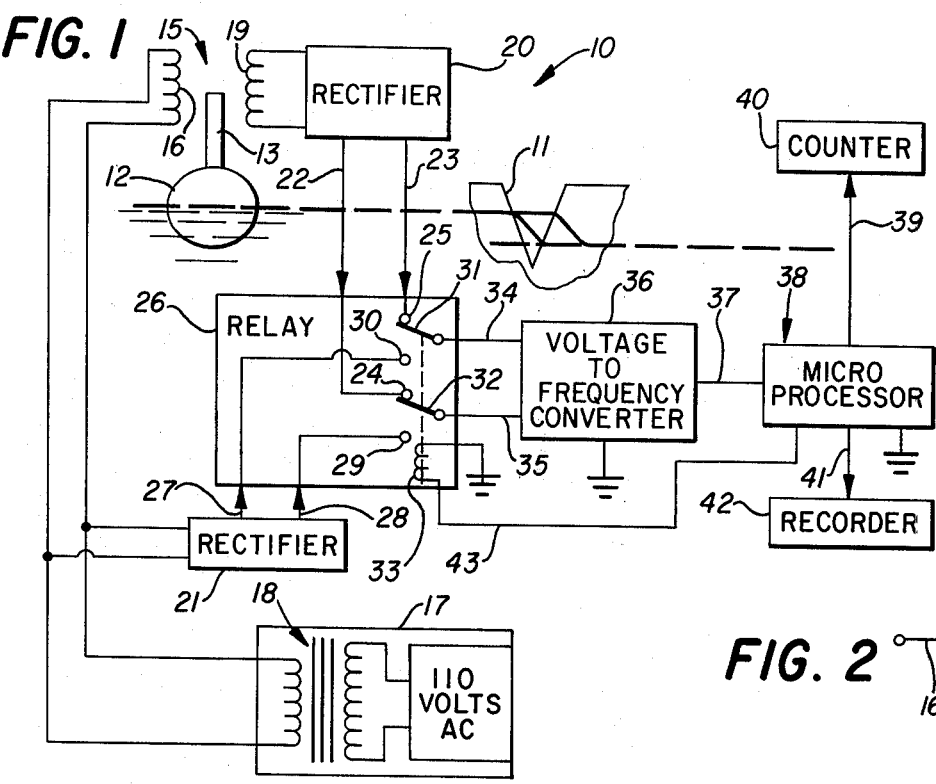

United States Patent [19]

Bibbee et al.

[11] 4,321,826
[45] Mar. 30, 1982

[54] FLOWMETER FOR FLUID FLOW THROUGH WEIRS AND PARSHALL FLUMES

[76] Inventors: William C. Bibbee, 1106 Nancy La., Lancaster, Tex. 75134; Stanley B. Capps, 4116 Timberidge, Dallas, Tex. 75227

[21] Appl. No.: 144,544

[22] Filed: Apr. 28, 1980

[51] Int. Cl.³ ............................................. G01F 1/20
[52] U.S. Cl. ...................................... 73/215; 73/313
[58] Field of Search ................ 73/215, 216, 227, 313, 73/453

[56] References Cited

U.S. PATENT DOCUMENTS

| | | | |
|---|---|---|---|
| 1,610,179 | 12/1926 | Thompson | 73/313 |
| 1,671,106 | 5/1928 | Fisher | 73/215 |
| 3,460,387 | 8/1969 | Brown | 73/861 X |

*Primary Examiner*—Charles A. Ruehl
*Attorney, Agent, or Firm*—Warren H. Kintzinger

[57] ABSTRACT

A float with an iron rod movable within a double coil AC coupling network measuring backed up liquid level as the measure of open channel, ditch or stream liquid flow through a weir or parshall flume. The AC output of the liquid measuring double coil is rectified and converted to a direct current signal passed to a voltage-to-frequency converter having a frequency output sensed and processed by a microprocessor. In a memory of the microprocessor there is a flow rate for each frequency that is calculated according to the number of gallons that will flow in a unit time. Thus, it is not necessary to linearize the coil and the same kind of coil can be used for any flow, with only a memory table in the microprocessor memory being changed for linear correction. This flow rate may be added for totalizing and/or put out to a digital-to-analog converter for recording and, if desired, controlling. Variation in AC line voltage is compensated for through periodic sampling, through a relay activated by the microprocessor circuit, rectification and voltage-to-frequency conversion to produce a frequency representing a given line voltage. As the line voltage goes up or down, the microprocessor makes corrective changes to the fluid level sensed signal.

10 Claims, 3 Drawing Figures

FLOWMETER FOR FLUID FLOW THROUGH WEIRS AND PARSHALL FLUMES

This invention relates in general to measurement of liquid flow through open channels, ditches or streams and, in particular, to a flowmeter for measuring fluid flow through weirs and parshall flumes.

Weirs and parshall flumes produce a contraction of a fluid flow stream causing the upstream level to back up to a higher level than the down stream level to a greater or lesser degree as a function of volumetric flow rate, with weir size and shape or flume size being a determining factor. The flow data is volumetric flow generally without regard to fluid density, with flow in accord with the following formulas, respectively:

Rectangular Weirs
$$\text{Flow} = 3.00 (L - 0.2 H) H^{1.5} \quad L \& H \text{ inches}$$

Contracted Cipolletti Weirs
$$\text{Flow} = 3.07 L H^{1.5} \quad L \& H \text{ inches}$$

Contracted Triangular Weirs
$$\text{Flow} = 2.2429 \left( \tan \frac{0}{2} \right)^{.0996} H^{2.47} \quad H \text{ inches}$$

Parshall Flumes
$$\text{Flow} = 12.47 W \left( \frac{H_a}{12} \right)^{1.5222} \left( \frac{W}{12} \right)^{0.02E} \quad W \& H_a \text{ inches}$$

Thus, it is seen that fluid flow for any given weir size or shape or parshall flume is a function of level with, however, the flow not a linear function with upstream level variation.

Fluid Flow = $XH(y)$

X and y are constant for a given size and shape H=height and L=weir top width—all in inches.

The upstream level change can be sensed by means of a float having a vertically extended iron rod thereabove extended into a double wound coil as part of an AC coupling network.

The variation in AC coupling with variation of iron rod insertion in the coil structure as determined by upstream fluid level and float height are a measure of fluid flow but not a linear function. Conversion of such sensed height and AC variation to a linear output would be quite useful and would lend itself to AC line voltage variation correction. The AC line voltage is periodically sensed, rectified and applied to a microprocessor for voltage variation correction of the fluid flow signals sent and recorded.

It is, therefore, a principal object of this invention to provide a reliable system for obtaining an accurate linear output fluid flow rate reading.

Another object is to attain such reliable linear fluid flow rate readings with a simple double wound coil network with a float moved iron core in an AC coupled signal to direct current signal and microprocessor correction processed read out without requiring shaped coils.

A further object is to correct the signal output for AC line voltage variation.

Features of this invention useful in accomplishing the above objects include, in a flowmeter for measuring fluid flow through weirs and parshall flumes, a float with an iron rod movable within a double coil AC coupling network consistent with vertical movement of the float. The float rides on the backed up liquid of an open channel, ditch or stream with the liquid flow through a weir or marshall flume. An AC voltage source is connected to and through the simple double coil AC coupling network to a rectifier having an output connection through a relay to a voltage-to-frequency converter. The output of the voltage-to-frequency converter is passed to a microprocessor having a count input from a converter and an output to a recorder. The AC voltage source is also connected directly to a rectifier having an output connection to the relay that is subject to control by the microprocessor for alternate connection from the sensed signal transmitting rectifier for AC voltage line variation correction within the microprocessor.

A specific embodiment representing what is presently regarded as the best mode of carrying out the invention is illustrated in the accompanying drawing.

Figure 2:
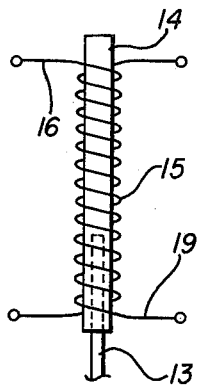
Figure 3:
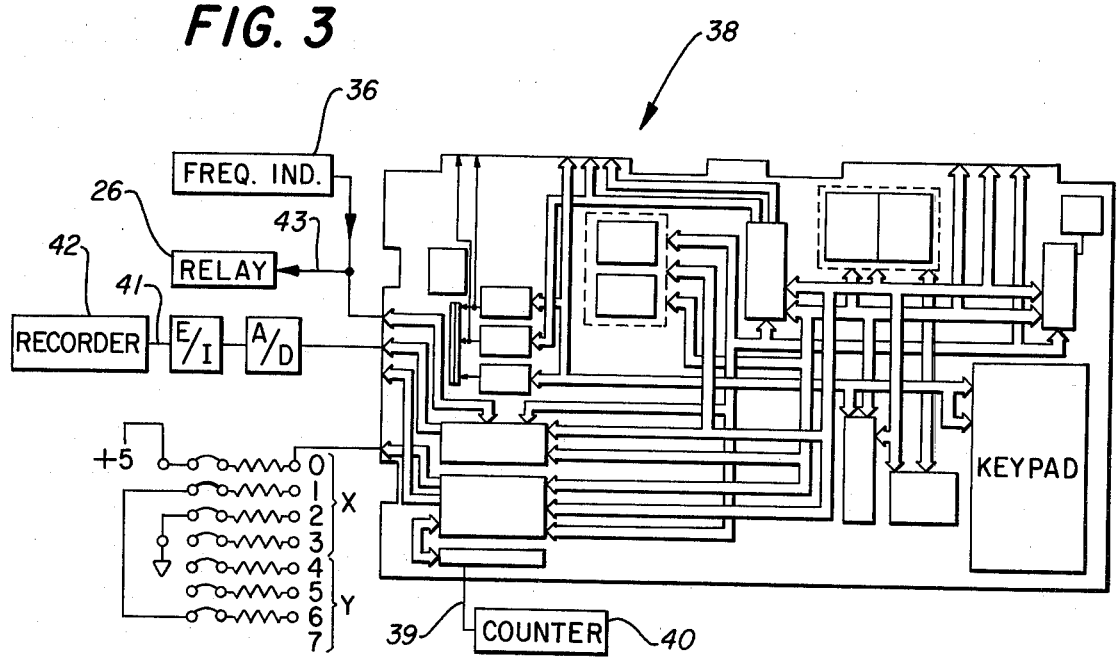

In the drawing:

FIG. 1 represents a block schematic diagram with a diagramatic showing of a system of fluid flow through a weir and an upstream float;

FIG. 2, a simple double wound coil on a tube with a movable iron rod core; and,

FIG. 3, a block schematic of a microprocessor used in the flowmeter.

Referring to the drawing:

The flowmeter system 10 of FIG. 1 for fluid flow through a weir 11 with fluid backed up to a higher level on the upstream side from a lower level on the downstream side of the weir 11. A float 12 supported by the upstream side fluid is equipped with an upwardly extended iron core rod 13 that extends upward within a plastic tube 14, shown in detail in FIG. 2, that mounts a double wound coil 15 on the outside with a primary coil winding 16 connected to an AC voltage supplier 17 fed 110-volt AC and including a transformer 18. The secondary coil 19 of the double wound coil 15 is connected as an input to AC to DC rectifier 20 and the output of the AC voltage supply has a direct connection to rectifier 21. The output lines 22 and 23 of rectifier 20 are connected to relay controls 24 and 25 of relay 26 and output lines 27 and 28 of rectifier 21 are connected to relay contacts 29 and 30 of relay 26 so that the relay switches 31 and 32 may be switched as activated by relay coil 33 from connection of rectifier 20 alternately to connection of rectifier 21 to the input lines 34 and 35 of voltage-to-frequency converter 36. Voltage-to-frequency converter 36 has an output connection through line 37 as an input to microprocessor 38 that also receives a count input through line 39 from counter 40. The microprocessor 38 has an output connection through line 41 to recorder 42 and a microprocessor controlled relay activating line 43 connection to relay coil 33 to alternately periodically sense the line voltage for correcting the sensed signal inputs to the microprocessor 38 within the microprocessor itself.

The microprocessor 38 may be one as presently supplied by Rockwell International, Synertek Systems Corporation, and other companies, with a SYM-1 module sold as a microcomputer system by Synertek Systems Corporation being a specific example used as part of the flowmeter system. The microprocessor 38 performs as a frequency counter, stores tables for translation of frequency representing fluid and float level into flow rates, and provides outputs to a recorder 42. The frequency out of voltage-to-frequency converter 36 is sensed by the microprocessor in which any given frequency represents a given flow rate, when relay 26 connects rectifier 20 to the converter 36, depending on the height of the float 12 and iron rod 13 along with the size and type of flow device like weir 11. In a memory table of microprocessor 38 there is a flow rate for each different frequency rate that is calculated in accord with the number of gallons that will flow in three seconds. This flow is added in some instances for totalizing and/or put through a digital-to-analog converter for recording and controlling to make the signal linear. Change in line voltage as has been referred to before will be seen in the output and must be compensated for. To accomplish this the line voltage from power supply 17 going to primary coil winding 16 is rectified and alternately, as connected by relay 26, passed to voltage-to-frequency converter 36, at which times a given frequency represents a given line voltage. Then as the measured line voltage goes up or down the microprocessor 38 makes corrective changes to the sensed signal level. A line voltage of 128 volts is taken as the standard value (although another standard could be used) and when the line voltage is sampled the sensed fluid level signal is adjusted down if the line voltage is above 128 and up when the line voltage is below 128. In the microprocessor 38 operation the fluid level signal is multiplied by 128 and divided by the line voltage signal. While this is close, an additional signal corrective change is made through use within the microprocessor of the formula:

$$[(128 - \text{line voltage}) \times X/Y] \pm \text{fluid level signal}$$

with X and Y set in the microprocessor program for any given weir or parshall flume unit by circuit strapping on the microprocessor 38 circuit board.

There are two main differences between applicant's flowmeter for fluid flow through weirs and parshall flumes and other existing flowmeter systems, such as represented by a B. F. Fisher U.S. Pat. No. 1,671,106 and L. W. Thompson U.S. Pat. No. 1,610,179, one of which is that the present system converts a signal to a linear output without changing winding, shape and sizing to accomplish compensation, as is the case with much of the existing art. The present system uses a small plastic pipe for a transformer with one winding beside the other and has an iron rod extending up into the pipe for guidance in up and down motion by the pipe. With this structure the further the iron rod is inserted into the pipe the greater AC signal coupling between the two coil windings.

By putting an alternating current signal on the one winding, the amount of alternating current out of the other one is proportional to the amount of iron rod inserted in the pipe; thus, measuring the rate of flow. Since the flow is not a linear function of height and the coupling is also not a linear function, it becomes necessary to convert the signal to a linear output. The alternating current signal of the second winding is rectified. The direct current signal goes to a voltage-to-frequency converter. There will be some coupling at "0" level, thus some direct current from the fluid level sensing rectifier and a given frequency transmitted to the microprocessor.

Whereas this invention is herein illustrated and described with respect to a specific embodiment thereof, it should be realized that various changes may be made without departing from essential contributions to the art made by the teachings hereof.

We claim:

1. A flowmeter for fluid flow through weirs and parshall flumes including: float means; a double wound coil including a primary coil and a secondary coil; AC power supply connection means for said primary coil; AC rectifier means connected to said secondary coil means, metalic coil core means mounted on said float means positioned for movement into and out of said double wound coil by degree with floating height variation movement of said float means; voltage-to-frequency converter means; circuit connective means interconnecting said AC rectifier means and said voltage-to-frequency converter means; and a microprocessor structure with memory means connected to receive an output from said voltage-to-frequency converter means, and connected for providing linearized outputs.

2. The flowmeter for fluid flow through weirs and parshall flumes of claim 1, wherein said metalic coil core means is a ferrous metal extension extending vertically above said float and into structure of said double wound coil.

3. The flowmeter for fluid flow through weirs and parshall flumes of claim 2, wherein the structure of said double wound coil includes guide means on which said primary coil and said secondary coil are wound; and with said ferrous metal extension extending into and guided in up and down movement by said guide means.

4. The flowmeter for fluid flow through weirs and parshall flumes of claim 3, wherein said guide means is a plastic tube mounted with a vertical orientation.

5. The flowmeter for fluid flow through weirs and parshall flumes of claim 3, wherein said double wound coil is a simple straight non-shaped coil.

6. The flowmeter for fluid flow through weirs and parshall flumes of claim 5, wherein counter means is connected to a linearized output of said microprocessor structure.

7. The flowmeter for fluid flow through weirs and parshall flumes of claim 5, wherein recorder means is connected to a linearized output of said microprocessor structure.

8. The flowmeter for fluid flow through weirs and parshall flumes of claim 7, also with counter means connected to an output of said microprocessor structure.

9. The flowmeter for fluid flow through weirs and parshall flumes of claim 5, wherein a rectifier circuit is connected between said AC power supply connection means and said circuit connective means; and wherein said circuit connective means includes a relay switch switchable alternately for connecting the rectifier circuits to said voltage-to-frequency converter; and microprocessor circuit connective means for activation of said relay switch.

10. The flowmeter for fluid flow through weirs and parshall flumes of claim 1, wherein a rectifier circuit is connected between said AC power supply connection means and said circuit connective means; and wherein said circuit connective means includes a relay switch switchable alternately for connecting the rectifier circuits to said voltage-to-frequency converter; and microprocessor circuit connective means for activation of said relay switch.

* * * * *